United States Patent
Byun et al.

(10) Patent No.: US 10,154,507 B2
(45) Date of Patent: Dec. 11, 2018

(54) METHOD OF ALLOCATING RESOURCES AND METHOD OF PROCESSING SIGNALS FOR TERMINAL

(71) Applicant: LG ELECTRONICS INC., Seoul (KR)

(72) Inventors: Ilmu Byun, Seoul (KR); Hyunsoo Ko, Seoul (KR); Kungmin Park, Seoul (KR); Heejeong Cho, Seoul (KR); Hyeyoung Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 87 days.

(21) Appl. No.: 15/127,944

(22) PCT Filed: Jul. 15, 2014

(86) PCT No.: PCT/KR2014/006343
§ 371 (c)(1),
(2) Date: Sep. 21, 2016

(87) PCT Pub. No.: WO2015/141901
PCT Pub. Date: Sep. 24, 2015

(65) Prior Publication Data
US 2017/0099673 A1    Apr. 6, 2017

Related U.S. Application Data

(60) Provisional application No. 61/968,377, filed on Mar. 21, 2014, provisional application No. 61/973,228, filed on Mar. 31, 2014.

(51) Int. Cl.
*H04W 4/00*     (2018.01)
*H04W 72/10*    (2009.01)
(Continued)

(52) U.S. Cl.
CPC .......... *H04W 72/10* (2013.01); *H04L 5/0037* (2013.01); *H04L 5/0064* (2013.01); *H04W 16/32* (2013.01);
(Continued)

(58) Field of Classification Search
CPC combination set(s) only.
See application file for complete search history.

(56) References Cited

U.S. PATENT DOCUMENTS

| 8,542,640 B2 | 9/2013 | Ramprashad et al. |
| 2009/0225728 A1 | 9/2009 | Tao et al. |

(Continued)

FOREIGN PATENT DOCUMENTS

KR    101124720    3/2012

OTHER PUBLICATIONS

NEC Group, "Coordinated Scheduling and Beamforming based Interface Mitigation Scheme in Dynamic TDD," R1-130367, 3GPP TSG RAN WG1 Meeting #72, Jan. 28- Feb. 1, 2013, see pp. 1-4.

*Primary Examiner* — Frank Duong
(74) *Attorney, Agent, or Firm* — Dentons US LLP

(57) ABSTRACT

A method of allocating resources according to the present invention comprises the steps of: allocating a signal having a first beam width from a first base station controlling a first cell to a predetermined resource; and allocating a signal, having a second beam width different from the first beam width, from a second base station controlling a second cell adjacent to the first cell to the resource. The signal having the first beam width may be a signal having a first priority, and the signal having the second beam width may be a signal having a second priority that is different from the first priority. Accordingly, a method for allocating resources is proposed which can stably receive signals even when a (Continued)

terminal that moves in a dense small cell structure is at a cell edge or a border region between cells.

15 Claims, 16 Drawing Sheets

(51) Int. Cl.
*H04W 16/32* (2009.01)
*H04W 72/04* (2009.01)
*H04L 5/00* (2006.01)

(52) U.S. Cl.
CPC ........... *H04W 72/046* (2013.01); *H04L 5/006* (2013.01); *H04L 5/0007* (2013.01)

(56) References Cited

U.S. PATENT DOCUMENTS

| | | |
|---|---|---|
| 2011/0081865 A1 | 4/2011 | Xiao et al. |
| 2013/0155847 A1* | 6/2013 | Li .................. H04W 24/04 370/225 |
| 2013/0331136 A1 | 12/2013 | Yang et al. |
| 2016/0323898 A1* | 11/2016 | Jo .................. H04B 7/0617 |

\* cited by examiner

FIG. 6

| | Orthogonal resources → | | | |
|---|---|---|---|---|
| cell A | Outer Priority 1 | Outer Priority 2 | Inner | Inner |
| cell B | Outer Priority 2 | Inner | Outer Priority 1 | Inner |
| cell C | Inner | Outer Priority 1 | Outer Priority 2 | Inner |

FIG. 8 terminal A

| $F_0$ | $F_1$ | $F_0$ | $F_1$ |
|---|---|---|---|
| $F_1$ | $F_0$ | $F_1$ | $F_0$ |
| $F_0$ | $F_1$ | $F_0$ | $F_1$ |
| $F_1$ | $F_0$ | $F_1$ | $F_0$ |

⋯

⋮ terminal B

| $F_1$ | $F_0$ | $F_1$ | $F_0$ |
|---|---|---|---|
| $F_0$ | $F_1$ | $F_0$ | $F_1$ |
| $F_1$ | $F_0$ | $F_1$ | $F_0$ |
| $F_0$ | $F_1$ | $F_0$ | $F_1$ |

| 2 | ... | n | 1 |
|---|-----|---|---|
| 2 | ... | n | 1 |
| 2 | ... | n | 1 |
| 2 | ... | n | 1 |
| 2 | ... | n | 1 |

$F_1 =$

| 1 | 2 | ... | n |
|---|---|-----|---|
| 1 | 2 | ... | n |
| 1 | 2 | ... | n |
| 1 | 2 | ... | n |
| 1 | 2 | ... | n |

| | Orthogonal resources → | | | | | |
|---|---|---|---|---|---|---|
| cell A | Outer Priority 1 | Outer Priority 2 | Inner | Outer Priority 1 | Inner | Inner |
| cell B | Outer Priority 2 | Inner | Outer Priority 1 | Inner | Outer Priority 1 | Inner |
| cell C | Inner | Outer Priority 1 | Outer Priority 2 | Inner | Inner | Outer Priority 1 |

METHOD OF ALLOCATING RESOURCES AND METHOD OF PROCESSING SIGNALS FOR TERMINAL

CROSS-REFERENCE TO RELATED APPLICATIONS

This application is a 35 USC § 371 National Stage entry of International Application No. PCT/KR2014/006343 filed on Jul. 15, 2014, and claims the benefit of priority of U.S. Provisional applications No. 61/968,377 filed on Mar. 21, 2014, and No. 61/973,228 filed on Mar. 31, 2014, all of which are incorporated by reference in their entirety herein.

BACKGROUND OF THE INVENTION

Field of the Invention

The present invention relates to a method of allocating resources and a method of processing a signal of a terminal, and more particularly, to a method of allocating resources by using codebook-based beamforming and a method of processing a signal of a terminal.

Related Art

Recently, commercialization of a long term evolution (LTE) system which is a next-generation wireless communication system has been supported earnestly. After recognizing necessity for supporting not only a voice service but also a large amount service with high quality in response to a user's demand while ensuring activity of a user of a terminal, the LTE system tends to be more rapidly increased than before. The LTE system provides a low transmission delay, a high transfer rate, and an improved system capacity and coverage.

With an introduction of such a high-quality service, there is a rapidly growing demand on a wireless communication service. Above all, capacity of a communication system must be increased to actively cope with this situation. A method of newly discovering an available frequency band and a method of increasing efficiency for a limited resource may be considered as an alternative of increasing communication capacity in a wireless communication environment.

As the method of increasing the efficiency for the limited resource, a so-called multi-antenna transmission/reception technique is actively developed in recent years with a remarkable attention, in which a spatial region for resource utilization is additionally ensured by placing a plurality of antennas to a transceiver to obtain a diversity gain or in which transmission capacity is increased by transmitting data in parallel through the respective antennas.

In a multi-antenna system, beamforming and precoding may be used as a method of increasing a signal to noise ratio (SNR). The beamforming and the precoding are used to maximize the SNR through feedback information in a closed-loop system capable of using the feedback information in a transmitting end.

SUMMARY OF THE INVENTION

An embodiment of the present invention proposes a resource allocation method capable of reliably receiving a signal even if a mobile terminal is in a cell edge, that is, an adjacent region between cells, in a dense small cell structure.

An embodiment of the present invention proposes a resource allocation method capable of performing beamforming having a plurality of beam widths.

Another embodiment of the present invention proposes a resource allocation method capable of performing beamforming having a different beam width according to an importance of a signal.

Another embodiment of the present invention proposes a resource allocation method for allocating orthogonal resources by a plurality of base stations according to a predetermined resource frame structure.

Another embodiment of the present invention proposes a resource allocation method for applying a different modulation scheme according to a beam width of a signal.

Another embodiment of the present invention proposes a signal processing method of a terminal which has received a signal having a different beam width transmits single feedback information for the signal.

According to one embodiment of the present invention, a resource allocation method includes: allocating a signal having a first beam width to a specific resource according to a specific frame structure for resource allocation from a first base station for managing a first cell; and allocating a signal having a second beam width different from the first beam width to the resource according to the frame structure from a second base station for managing a second cell adjacent to the first cell. The signal having the first beam width may be a signal having a first priority, and the signal having the second beam width may be a signal having a second priority different from the first priority.

If the first priority is higher than the second priority, a beam width of the signal having the first priority may be greater than a beam width of the signal having the second priority.

Transmit power of the signal having the first priority may be higher than transmit power of the signal having the second priority.

The signal having the first priority may be allocated to an outer resource of the first cell, and the signal having the second priority may be allocated to an outer resource of the second cell.

If each of the first base station and the second base station allocates signals having priorities 1 to N, the first base station and the second base station may allocate more resources to a high-priority signal.

If the first base station allocates N signals having priorities 1 to N according to a pre-set first resource frame structure, in the first resource frame structure, a signal having an $n^{th}$ priority as any one of the priorities 1 to N may be allocated to be cyclically shifted on a time axis and a frequency axis according to a specific pattern. If the second base station allocates the N signals having the priorities 1 to N according to a pre-set second resource frame structure, in the second resource frame structure, the signal having the $n^{th}$ priority as any one of the priorities 1 to N may be allocated to be cyclically shifted on the time axis and the frequency axis according to the pattern. A priority of a signal allocated by the first base station to a specific resource of the first resource frame structure and the second resource frame structure may be not the same as a priority of a signal allocated by the second base station.

If the first base station allocates N signals having priorities 1 to N according to a pre-set first resource frame structure, in the first resource frame structure, a signal having an $n^{th}$ priority as any one of the priorities 1 to N may be allocated to be cyclically shifted on a frequency axis. If the second base station allocates the N signals having the priorities 1 to N according to a pre-set second resource frame structure, in the second resource frame structure, the signal having the $n^{th}$ priority as any one of the priorities 1 to N may be allocated to be cyclically shifted on the frequency axis according to the pattern. A priority of a signal allocated by the first base station to a specific resource of the first resource frame structure and the second resource frame structure may be not the same as a priority of a signal allocated by the second base station.

The resource allocation method may further include: if the first base station allocates signals having priorities 1 to N, receiving single codebook feedback information from a terminal; determining different codebooks according to the priorities on the basis of the codebook feedback information; and generating signals having different beam widths by applying the different codebooks.

The resource allocation method may further include: if the first base station allocates signals having priorities 1 to N, receiving codebook feedback information corresponding each priority from a terminal; determining a codebook to be applied to a signal having an $n^{th}$ priority on the basis of codebook feedback information corresponding to the priorities 1 to n (1=<n=<N); and generating signals having the priorities 1 to N by applying the determined codebook.

If the first base station allocates signals having a first priority and a second priority and if the first priority is higher than the second priority, the signal having the first priority may be modulated with a modulation scheme lower than a location scheme of the signal having the second priority.

In this case, the first base station may allocate more resources to the signal having the first priority than the signal having the second priority.

According to another embodiment of the present invention, a signal processing method of a terminal may include: receiving a first beam formed in a first base station and a second beam formed in a second base station adjacent to the first base station according to a specific frame structure for resource allocation; and if a beam width of the first beam is greater than a beam width of the second beam, cancelling interference for the second beam by using reference information for the second beam. The frame structure may contain information for priorities of the first and second beams to be allocated to a specific resource.

The signal processing method may further include: receiving N signals having priorities 1 to N from the first base station according to a pre-set first resource frame structure, and receiving N signals having priorities 1 to N from the second base station according to a pre-set second resource frame structure.

In this case, in the first resource frame structure, a signal having an $n^{th}$ priority as any one of the priorities 1 to N may be allocated to be cyclically shifted on a time axis and a frequency axis according to a specific pattern. In the second resource frame structure, the signal having the $n^{th}$ priority as any one of the priorities 1 to N may be allocated to be cyclically shifted on the time axis and the frequency axis according to the pattern as to the time axis. A priority of a signal allocated by the first base station to a specific resource of the first resource frame structure and the second resource frame structure may be not the same as a priority of a signal allocated by the second base station.

The signal processing method may include: receiving N signals having priorities 1 to N from the first base station according to a pre-set first resource frame structure; and receiving N signals having priorities 1 to N from the second base station according to a pre-set second resource frame structure.

In this case, in the first resource frame structure, a signal having an $n^{th}$ priority as any one of the priorities 1 to N may be allocated to be cyclically shifted on a frequency axis. In the second resource frame structure, the signal having the $n^{th}$ priority as any one of the priorities 1 to N may be allocated to be cyclically shifted on the frequency axis. A priority of a signal allocated by the first base station to a specific resource of the first resource frame structure and the second resource frame structure may be not the same as a priority of a signal allocated by the second base station.

The signal processing method may further include: receiving a plurality of beams having priorities 1 to N from the first station; and transmitting single codebook feedback information for the plurality of beams.

According to an embodiment of the present invention, it is proposed a resource allocation method capable of reliably transmitting a signal even if a mobile terminal is in a cell edge, that is, an adjacent region between cells, in a dense small cell structure.

According to an embodiment of the present invention, it is proposed a resource allocation method capable of performing beamforming having a plurality of beam widths.

According to another embodiment of the present invention, it is proposed a resource allocation method capable of performing beamforming having a different beam width according to an importance of a signal.

According to another embodiment of the present invention, it is proposed a resource allocation method for allocating orthogonal resources by a plurality of base stations according to a predetermined resource frame structure.

According to another embodiment of the present invention, it is proposed a resource allocation method for applying a different modulation scheme according to a beam width of a signal.

According to another embodiment of the present invention, it is proposed a signal processing method of a terminal which has received a signal having a different beam width transmits single feedback information for the signal.

BRIEF DESCRIPTION OF THE DRAWINGS

FIG. 6 shows a resource allocation frame structure according to an embodiment of the present invention.

FIG. 8 shows an extended frame structure of two terminals having a resource allocation frame structure of FIG. 7.

FIG. 9 shows an extended frame structure of three terminals having a resource allocation frame structure of FIG. 7.

FIG. 10 shows a resource allocation frame structure according to another embodiment of the present invention.

FIG. 11 shows a resource allocation frame structure according to another embodiment of the present invention.

DESCRIPTION OF EXEMPLARY EMBODIMENTS

Figure 1A:
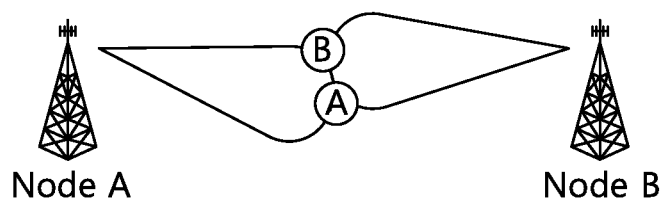
FIG. 1a shows a signal of an adjacent region between cells in case of using wide beamforming.

Since the present invention may have various modifications and diverse embodiments, only specific embodiments are exemplarily illustrated in the drawings and will be described in detail. However, the present invention should not be construed as being limited to the specific embodiments set forth herein. The terminology used herein is for the purpose of describing particular embodiments only and is not intended to be limiting of the invention Hereinafter, exemplary embodiments of the present invention will be described in detail with reference to the accompanying drawings. Wherever possible, the same reference numbers will be used throughout the drawings to refer to the same or like parts. In the following description, well-known functions or constructions are not described in detail since they would obscure the invention in unnecessary detail.

The present specification is described based on a communication network. A task achieved in the communication network may be achieved in a process of controlling a network and transmitting data in a system (e.g., a base station) for managing the communication network, or the task may be achieved in a terminal linked to the network.

A dense small cell structure is a technique for satisfying data traffic required in the future. A data transfer rate and channel capacity for the dense small cell structure are expressed by Equation 1 below.

[Equation 1]

$$R < C = m\left(\frac{W}{n}\right)\log_2\left(1 + \frac{S}{1+N}\right) \quad \text{[Equation 1]}$$

In Equation 1, m denotes the number of spatial streams, W denotes a bandwidth, and n denotes the number of users allocated to a base station.

Similarly to Equation 1, if the number (n) of users is decreased by increasing the number of base stations, a transfer rate per user may be increased.

Meanwhile, in this dense small cell structure, since a distance between base stations is decreased, a relative magnitude of interference may be increased. That is, the interference may be a more primary cause of a transfer rate decrease than a noise. Since a cell size is decreased, a user terminal experiences a frequent handover. Further, since a distance between base stations is decreased, there may be a problem in that a reception signal of a cell edge user can easily enter in a guard interval.

As such, if inter-cell inference occurs, a terminal may perform interference cancellation for suppressing or removing an interference signal.

In order for the terminal to cancel the interference, several conditions are required. First, the terminal must know a channel of the interference signal. That is, a reference signal (e.g., pilot, modulation order, etc.) of the interference signal must be known. Further, the interference signal and a reception signal must be synchronized, and if the reception signal uses orthogonal frequency division multiplexing (OFDM), the interference signal must enter in a guard interval. Further, the interference cancellation is possible only when the terminal can restore the interference signal in a state of including the reception signal. As such, if information regarding the interference signal is shared, it is preferable to restore the interference signal when a magnitude of interference is great.

That is, in order to increase an SNR of the reception signal, it is preferable that the interference signal is very weak or a magnitude of interference is great to facilitate interference cancellation.

Figure 1B:
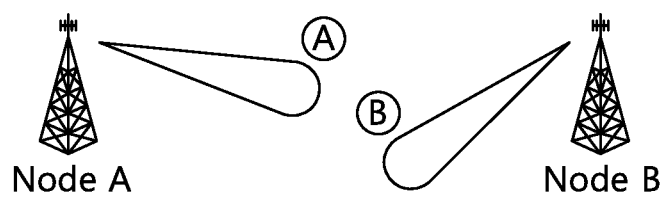
FIG. 1b shows a signal of an adjacent region between cells in case of using narrow beamforming.

FIG. 1a shows a signal of an adjacent region between cells in case of using wide beamforming, and FIG. 1b shows a signal of an adjacent region between cells in case of using narrow beamforming.

As shown in FIG. 1a and FIG. 1b, a terminal A and a terminal B may be located in a border region, that is, a cell edge region, in which there is a possibility that signals transmitted from a base station A (or node A) and a base station B (or node B) are received simultaneously.

If wide beamforming is achieved as shown in FIG. 1a, a terminal can receive a signal transmitted from the base station even if the terminal moves, thereby preferably ensuring mobility of the terminal. However, since a beam width is wide, there is a high possibility that interference occurs between signals received from the terminal A and the terminal B.

On the other hand, as shown in FIG. 1b, when beamforming is achieved with a narrow width, there is a high possibility that an interference signal is great at the occurrence of interference between signals. Therefore, if the terminal knows channel information as described above, interference cancellation is easy, which may lead to an increase in an SNR. However, if the terminal moves due to a narrow beam width, there is a high possibility that a beamforming direction of a reception signal is misaligned, which may result in a high probability that reception performance of the signal deteriorates.

Accordingly, the present invention proposes differential beamforming for transmitting a signal having a different beam width to ensure mobility of the terminal. The base station may apply beamforming differentially according to an importance of a signal to be transmitted.

Figure 2:
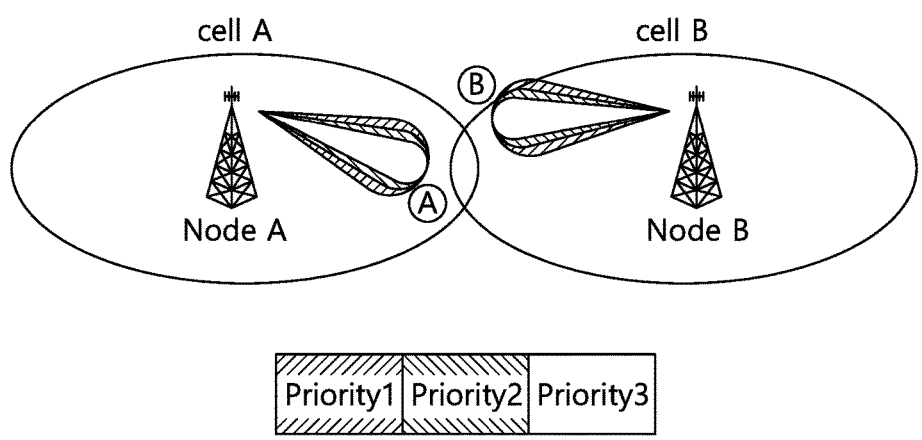
FIG. 2 is a drawing for describing differential beamforming according to an embodiment of the present invention.

FIG. 2 is a drawing for describing differential beamforming according to an embodiment of the present invention.

It is assumed that a node A manages a cell A, a node B manages a cell B, a terminal A receives a signal transmitted from the node A, and a terminal B receives a signal transmitted from the node B.

The node A and the node B may widely apply beamforming to important information to be received always by the terminal, and information to be additionally transmitted may narrow a width of beamforming step-by-step according to an importance. That is, a priority may be configured according to an importance of a signal to be transmitted, and a beam width may be adjusted according to the priority.

That is, according to the present invention, a priority is configured on the basis of an importance of data, and a signal having a different priority has a different beam width. The higher the priority, the wider the beam width. The lower the priority, the narrower the beam width.

According to one example, as shown in FIG. 2, beams may have three priorities. A beam having a first priority may be formed to be widest, and a beam having a lowest priority may be formed to be narrowest. Signals having different priorities may be allocated to orthogonal resources.

According to one embodiment of the present invention, in a channel code in which encoding data includes input data, a high priority may be assigned to an information bit, and a low priority may be assigned to a parity bit. The channel code is characterized in that a signal can be restored by using only the information bit, and a rate-compatible code can be easily generated by adjusting a length of the parity bit. In general, the information bit is more important than the parity bit in the channel code. A case where deterioration occurs while the information bit passes through a channel exhibits worse performance than a case where deterioration occurs while the parity bit passes through a channel.

Accordingly, a first priority may be assigned to the information bit which is more important information, and a second priority may be assigned to the parity bit. A beam width for a signal for the information bit may be formed by a base station to be wider than a beam width of a signal for the parity bit.

According to another embodiment of the present invention, differential beamforming may also be applied to a hierarchical video coding signal. In case of video coding including a plurality of layers, information for a base layer which is the most basic information is most important. In an enhancement layer in which coding can be achieved on the basis of the base layer, reception or decoding cannot be normally achieved when the information for the base layer is lost or deteriorates.

In video coding to which different scalabilities such as temporal scalability, spatial scalability, quality scalability, etc., are applied, a first priority which is the highest priority may be assigned to the base layer to apply the widest beamforming thereto, and as to a higher layer, a low priority may be assigned to an enhancement layer, thereby decreasing a beam width.

In addition to the aforementioned example, a beam priority may be assigned variously according to a data type and an importance. The priority may be assigned according to audio and video signals.

When differential beamforming is applied as described above according to an information importance, even if a terminal moves or channel information contained in a base station is incorrect, the terminal can receive core information. Further, if the channel information of the base station is correct, the terminal can decode an additional signal by receiving additional information, thereby improving reliability, accuracy, quality, or the like of reception information.

A beam width may be determined by a precoder used in precoding processing for processing a signal according to a specific intention in a transmitting end. That is, the beam width may be considered in a precoding matrix, and the beam width may be determined in accordance with a specific precoding index.

As shown in FIG. 2, in a cell edge region in which the cell A and the cell B are adjacent, interference may occur between a beam transmitted from the node A and a beam transmitted from the node B. In this case, the node A and the node B may allocate signals having different priorities to a border region of the cells so that an interference signal can be cancelled by the terminal A and the terminal B.

If the node A for managing the cell A allocates a high-priority signal to a specific resource, the node B for managing the neighboring cell B may allocate a low-priority signal to the resource. For example, if the node A and the node B can transmit signals with priorities 1 to N, signals allocated to a resource to which the priority 1 is assigned for the terminal A may be allocated for the terminal B in a reverse order starting from the priority N.

Figure 3A:
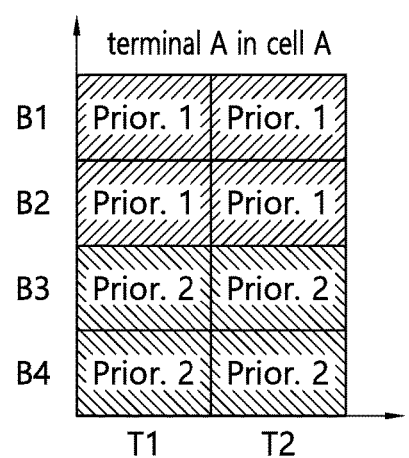
FIG. 3a shows a resource allocated to a terminal A of a cell A according to an embodiment of the present invention.
Figure 3B:
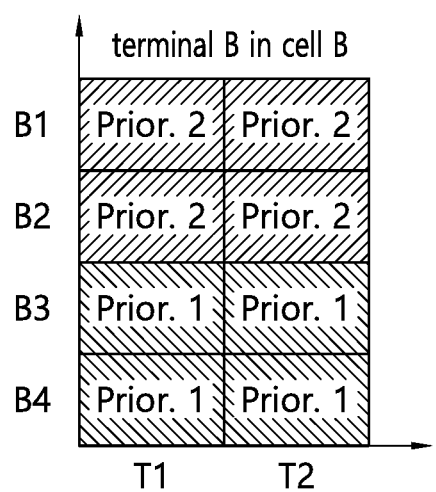
FIG. 3b shows a resource allocated to a terminal B of a cell B according to an embodiment of the present invention.

FIG. 3a shows a resource allocated to a terminal A of a cell A according to an embodiment of the present invention, and FIG. 3b shows a resource allocated to a terminal B of a cell B according to an embodiment of the present invention.

As shown, a node A may allocate signals having two priorities, i.e., a first priority and a second priority, to a band region on a time axis. In this case, a node B allocates a signal having a second priority for the terminal B to a resource to which a signal having a first priority is allocated for the terminal A, and on the contrary, allocates a signal having a first priority for the terminal B to a resource to which a signal having a second priority is allocated for the terminal A. That is, the node A and the node B allocate signals having different priorities to the same resource. As described above, the signals having the different priorities have different beam widths, which implies differential beamforming.

As such, if the different beamforming is performed, a probability that a signal of the terminal A is interfered by a signal of the terminal B is decreased.

Alternatively, even if the signal having the first priority is interfered by the signal having the second priority, strong interference may occur due to a signal having a narrow beam width. If an interference signal is strong, it is easy to cancel a signal of the terminal B when the terminal A knows a reference signal of the terminal B. Alternatively, if the terminal A receives a low-priority signal, this is advantageous for signal restoration since receive power of the signal is greater than a high-priority interference signal delivered from the node B.

Figure 4A:
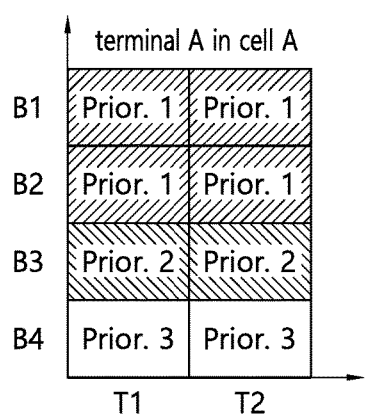
FIG. 4a shows a resource allocated to a terminal A of a cell A according to another embodiment of the present invention.
Figure 4B:
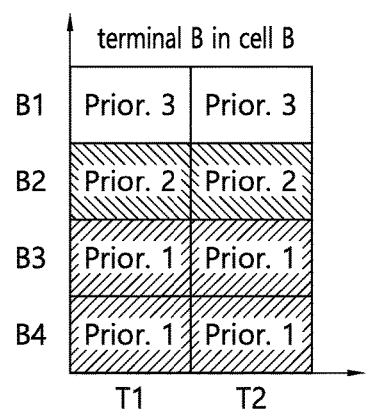
FIG. 4b shows a resource allocated to a terminal B of a cell B according to another exemplary embodiment of the present invention.

FIG. 4a shows a resource allocated to a terminal A of a cell A according to another embodiment of the present invention, and FIG. 4b shows a resource allocated to a terminal B of a cell B according to another exemplary embodiment of the present invention.

When conforming to the present embodiment, transmit power may be applied differentially according to an information importance. That is, the higher the priority of the signal, the higher the power may be allocated. For example, if the node A and the node B can transmit signals with priorities 1 to N, signals allocated to a resource to which the priority 1 is assigned for the terminal A may be allocated for the terminal B in a reverse order starting from the priority N. In this case, the higher the priority, the higher the transmit power allocated by the terminal A and the terminal B. When a high power signal is allocated from the terminal A, a low power signal is allocated to the terminal B.

As shown in FIG. 4a, the node A may allocate signals having three priorities, i.e., a first priority, a second priority, and a third priority, to a band region on a time axis. In this case, the node B allocates a signal having a second priority and a third priority for the terminal B to a resource to which a signal having a first priority is allocated for the terminal A, and on the contrary, allocates a signal having a first priority for the terminal B to a resource to which a signal having a second priority and a third priority is allocated for the terminal B.

When transmit power is allocated differentially to differential beamforming as described in the present embodiment, since strength of interference entering a high-priority signal is weak, the high-priority signal can be received reliably. Further, since strength of interference entering a low-priority signal is strong, interference cancellation is easy when a terminal knows channel information of an interference signal.

Figure 5:
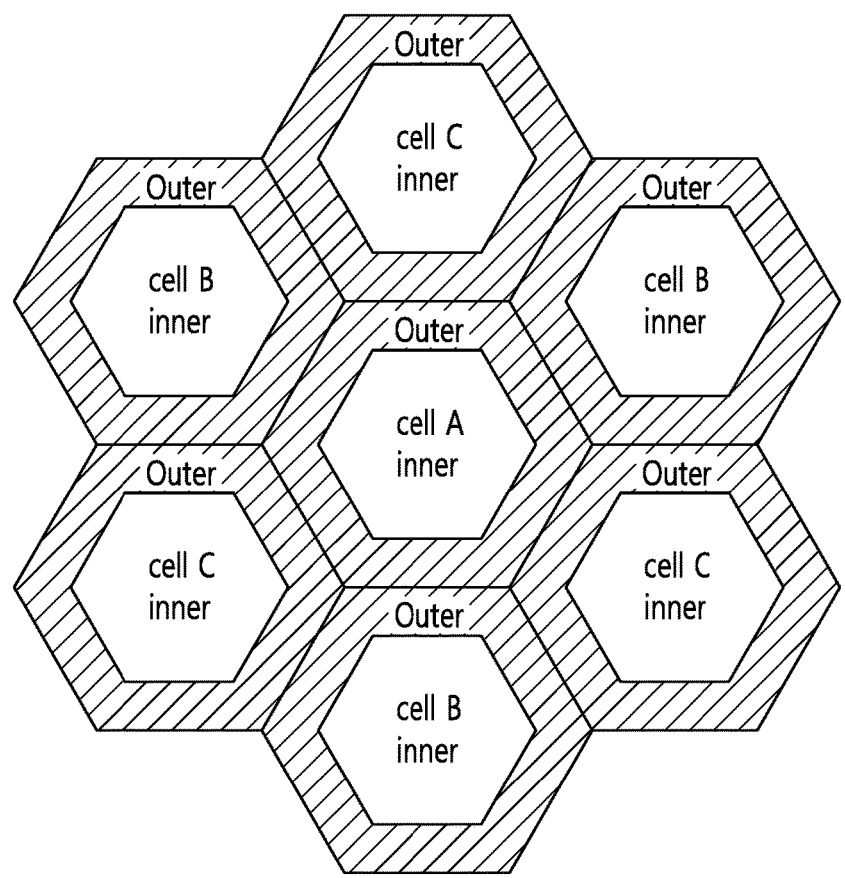
FIG. 5 is a schematic view for describing cells located adjacent to each other according to the present invention.

FIG. 5 is a schematic view for describing cells located adjacent to each other according to the present invention. As shown, a cell B and a cell C are adjacent to each other in a triangular structure with a cell A in a center.

Individual base stations for managing the respective cells use a pre-set frame structure to deploy signals having different priorities to the same resource.

A resource provided to each cell is divided into an inner resource having a low possibility of signal interference and an outer resource expected to have inter-cell interference. In the present invention, the inner resource indicates a resource provided to an area inside the cell, and the outer resource indicates a resource provided to a cell border, a cell edge region, and an adjacent region between cells. A resource of the cell may be utilized in a manner of a fractional frequency reuse in which the resource is divided into the inner resource and the outer resource, and a fractional frequency allocated to the outer resource may be allocated to signals having a plurality of priorities. However, when conforming to the present invention, although the resource is divided into the inner resource and the outer resource, all cells can use all frequency resources instead of fractionally utilizing the frequency resource. FIG. 6 shows a resource allocation frame structure according to an embodiment of the present invention.

In FIG. 6, a horizontal direction indicates an axis of orthogonal resources. Referring to a first column of FIG. 6, for the same resource, a signal having a first priority is allocated to an outer resource of a cell A. A signal having a second priority is allocated to an outer resource of a cell B. An inner resource is allocated to a cell C.

In a second column, for the same resource, a signal having a second priority is allocated to an outer resource of the cell A. A signal having a first priority is allocated to an outer resource of the cell C. An inner resource is allocated to the cell B.

That is, a node A, a node B, and a node C may share the resource allocation frame of FIG. 6, and may allocate a resource according to the shared frame structure.

When there are more users in the inner area and thus it is necessary to allocate more inner signals, the inner signals are additionally deployed to the same resource. In a fourth column of FIG. 6, it is shown that an inner resource is allocated to each cell.

Figure 7:
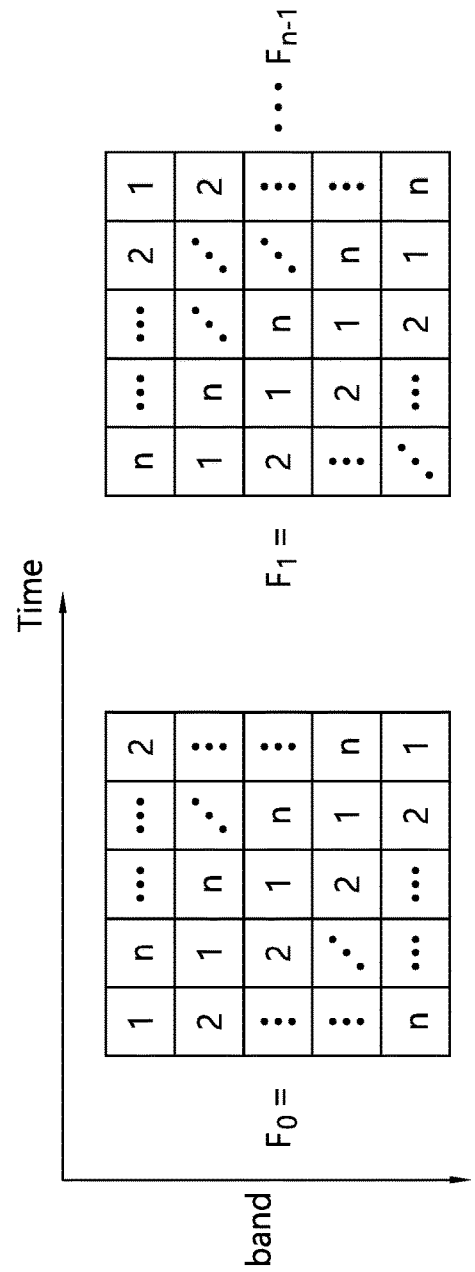
FIG. 7 shows a resource allocation frame structure according to another embodiment of the present invention.

FIG. 7 shows a resource allocation frame structure according to another embodiment of the present invention. In FIG. 7, each box indicates a resource, and a number indicates a priority.

As shown, in a frame structure for obtaining time and frequency diversities, a priority may be deployed in a circular matrix form. If signals having priorities 1 to n can be allocated to a cell, a frame may have structures F0 to Fn−1. A specific priority may be cyclically shifted according to a specific pattern on a time axis and a frequency axis in a frame. As shown, the priority is cyclically shifted in a horizontal direction of the time axis and a vertical axis of the frequency axis, that is, in a diagonal direction.

Figure 9:
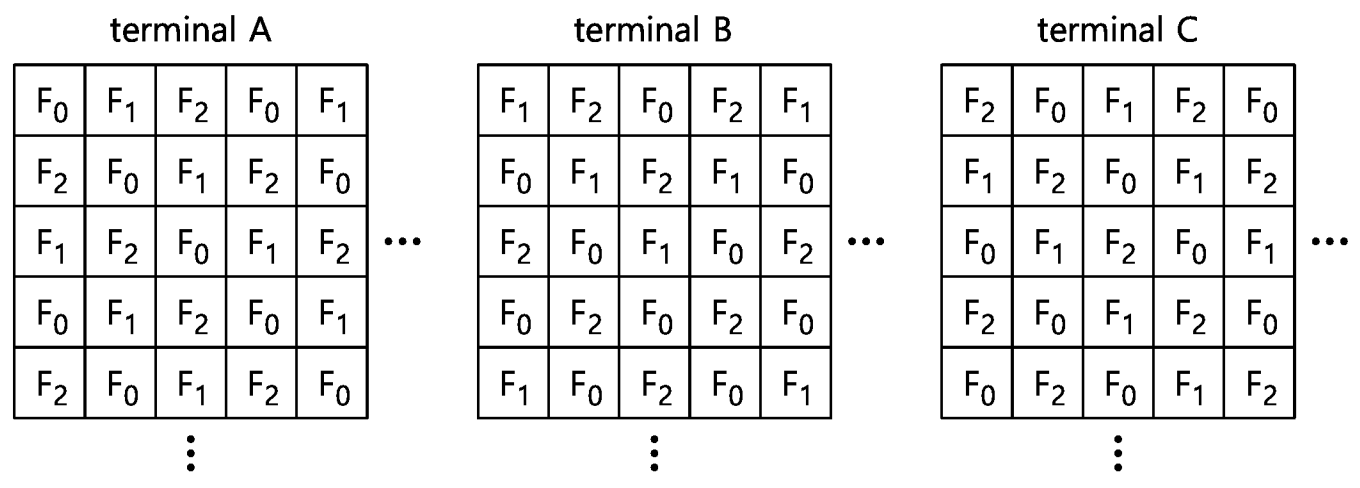

FIG. 8 shows an extended frame structure of two terminals having the resource allocation frame structure of FIG. 7, and FIG. 9 shows an extended frame structure of three terminals having the resource allocation frame structure of FIG. 7.

As shown in FIG. 8, both of a terminal A and a terminal B may receive signals having two priorities. In this case, a resource may be allocated according to the extended frame structure in which F0 and F1 of FIG. 7 are deployed repetitively.

That is, if resources are allocated according to F0 which is a first resource frame structure for the terminal A, resources may be allocated according to F1 which is a second resource frame structure for the terminal B. In both of the first resource frame structure and the second resource frame structure, a specific priority is circularly shifted on a time axis and a frequency axis according to a specific pattern. However, signals allocated to a specific resource of the first resource frame structure and the second resource frame structure, that is, the same resource, do not have the same priority. That is, a priority does not overlap in signals allocated to the same resource.

FIG. 9 may also be described similarly to FIG. 8. All of a terminal A, a terminal B, and a terminal C may receive signals having three priorities. In this case, resources may be allocated according to an extended frame structure in which F0, F1, and F2 of FIG. 7 are deployed repetitively.

When a resource is allocated according to a first resource frame structure F0 for the terminal A, a resource may be allocated according to a second resource frame structure F1 for the terminal B, and a resource may be allocated according to a third resource frame structure F2 for the terminal C. In all of the first resource frame structure, the second resource frame structure, and the third resource frame structure, a specific priority is cyclically shifted on a time axis and a frequency axis according to a specific pattern. However, signals allocated to a specific resource of the first resource frame structure, the second resource frame structure, and the third resource frame structure, that is, the same resource, may have different priorities.

In case of a structure in which signals having the same priority are not allocated to the same resource for each terminal, the resource allocation frame structures F0, F1, and F2 of FIG. 8 and FIG. 9 are not limited to the resource allocation frame structure of FIG. 7, and resources can be deployed in various forms as long as time and frequency diversities can be supported.

Figure 10:
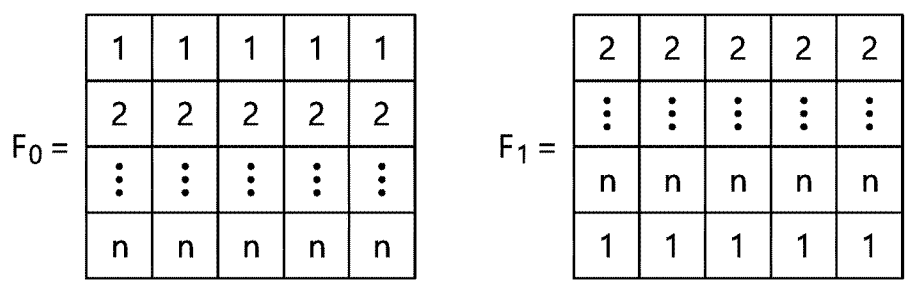

FIG. 10 shows a resource allocation frame structure according to another embodiment of the present invention.

In the resource allocation frame structure of FIG. 10, allocation is achieved such that a priority of a signal is cyclically shifted on a frequency axis. That is, signals having the same priority are allocated to a specific frequency axis, and the priority is vertically shifted on the frequency axis. Also in this case, signals allocated to specific resources of the first resource frame structure F0 and the second resource allocation frame structure F1 have different priorities.

The first resource allocation frame structure F0 and second resource allocation frame structure F1 of FIG. 10 may be applied to form the extended resource allocation frame structures of FIG. 8 and FIG. 9. Each base station performs beamforming according to a predetermined resource allocation frame structure.

FIG. 11 shows a resource allocation frame structure according to another embodiment of the present invention.

When conforming to the present embodiment, each base station may allocate more resources to a high-priority signal. Since the high-priority signal has a wide beam width, reception signal strength of a terminal may be decreased. More resources may be allocated to the high-priority signal to compensate for the disadvantage of the decrease in the signal strength. However, in this case, it is preferable to minimize deployment of signals having the same priority to the same resource.

Referring to FIG. 11, a signal having a first priority, a signal having a second priority, and a signal of an inner area are allocated to respective cells, and thereafter the signal having the first priority is allocated to an outer area of each cell. That is, the signal having the first priority is allocated to more resources than the signal having the second priority.

In order for the signal having the first priority to be more allocated, third to fifth columns of FIG. 11 may be additionally repeated.

Further, in a case where it is necessary to provide more inner resources, the inner resources are additionally deployed to the same resource. A column in which inner resources are allocated to respective cells may be added in FIG. 11.

Figure 12:
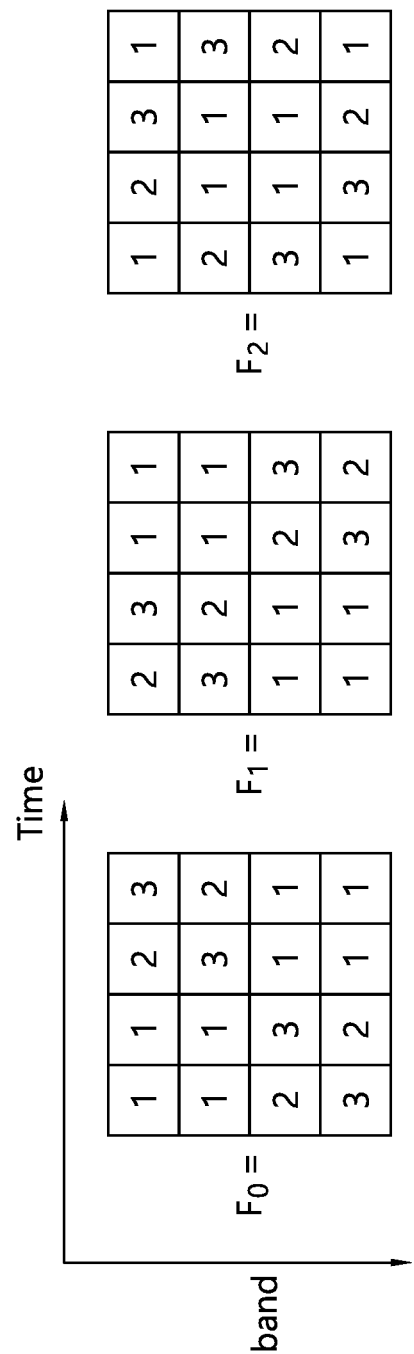
FIG. 12 shows a resource allocation frame structure according to another embodiment of the present invention.

FIG. 12 shows a resource allocation frame structure according to another embodiment of the present invention.

As shown, resources having three priorities are arranged in a first resource allocation frame structure F0, a second resource allocation frame structure F1, and a third resource allocation frame structure F2. When conforming to the present embodiment, an inner resource and an outer resource are not distinguished.

In each of the resource allocation frame structures F0, F1, and F2, resources are allocated the most to a signal having a highest priority, that is, a signal having a first priority. In other words, if a base station allocates signals having priorities 1 to N, the base station may allocate more resources to a high-priority signal.

Figure 13:
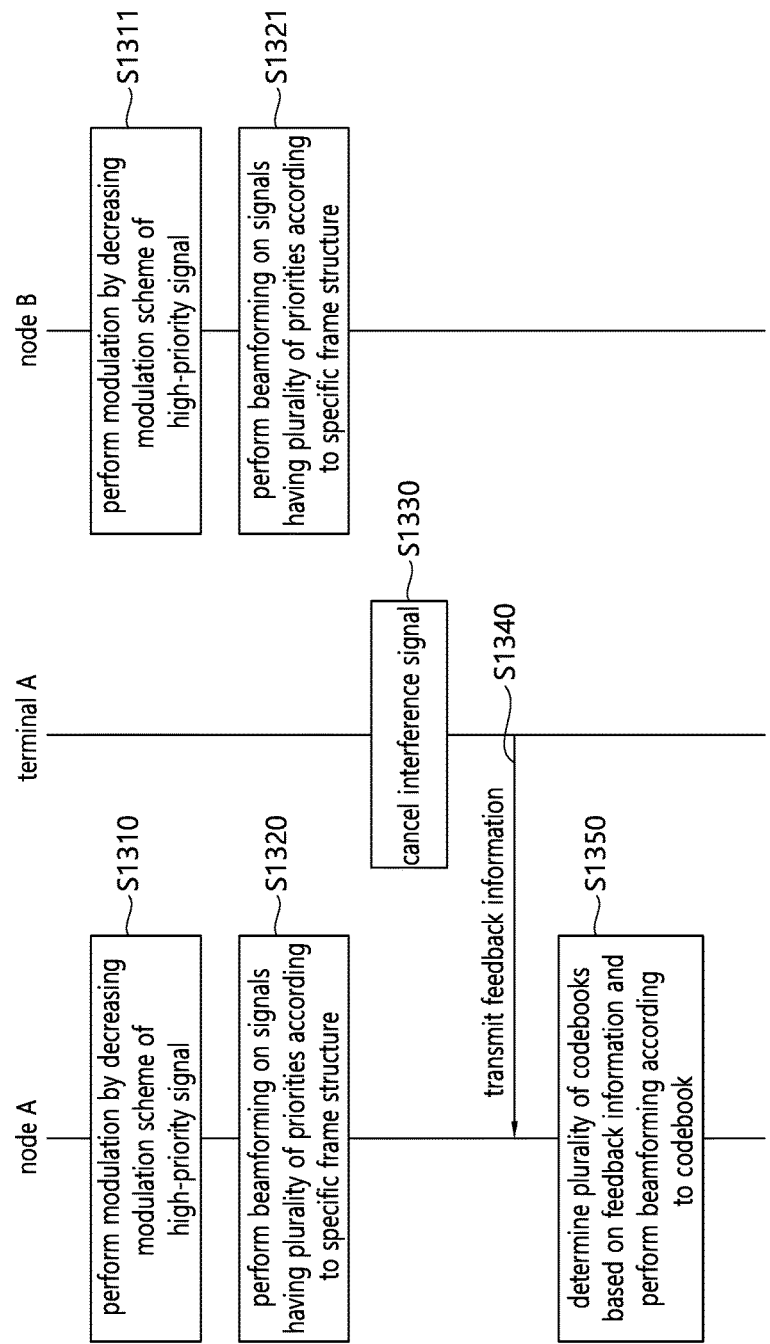
FIG. 13 is a control flowchart for describing resource allocation and signal processing according to the present invention.

FIG. 13 is a control flowchart for describing resource allocation and signal processing according to the present invention. Referring to FIG. 13, a resource allocation method of a base station and a signal processing method of a terminal are described below. For convenience of explanation, it is assumed that a node A and a node B can provide signals having a plurality of priorities to a terminal A, and the terminal A is a terminal which primarily receives a signal of a cell A in an adjacent region between the cell A managed by the node A and a cell B managed by the node B.

First, for differential beamforming, the node A and the node B may adjust a modulation scheme of a signal differently for each priority. That is, the node A and the node B modulate a high-priority signal with a lower modulation scheme than a low-priority signal (S1310, S1311). The priority may be determined according to an importance of signals, that is, an importance of data. The higher the priority, the wider the beam width for mobility security of the terminal.

If the high-priority signal is beamformed to be wider than the low-priority signal, strength of the low-priority signal which has a relatively narrower beam width is greater than strength of the high-priority signal. Therefore, in order for the terminal to reliably receive the high-priority signal, the high-priority signal is preferably modulated with a low modulation scheme.

For example, the node A and the node B may design a modulation and coding selection (MCS) table which considers a signal to noise ratio (SNR) of signals having different priorities as shown in Table 1. That is, a function f of mapping the MCS by using the SNR as a variable may be expressed as f(SNR1, SNR2, . . . , SNRn)=(MCS1, MCS2, . . . , MCSn).

TABLE 1

| SNR | MCS |
| --- | --- |
| (5 dB, 10 dB, . . . , 20 dB) | ([QPSK, 1/3], [QPSK, 1/2], . . . , [16QAM, 1/3]) |
| (5 dB, 6 dB, . . . , 20 dB) | ([QPSK, 1/3], [QPSK, 1/3], . . . , [16QAM, 2/3]) |

According to another embodiment of the present invention, if the modulation scheme of the high-priority signal is decreased as described above, the node A and the node B allocate more resources to the high-priority signal to the extent of decreasing the modulation scheme so as to transmit data with the same amount as data transmitted by the low-priority signal.

For example, in a case where f(x) is a function for mapping an SNR to an MCS option by using a signal's SNR as a variable (x), if a reception SNR of an $i^{th}$ priority signal is SNRi, an MCS option may be expressed as MCSi=f(SNRi), and if a reception SNR of an $(i+1)^{th}$ priority signal is SNRi+1, an MCS option may be expressed as MCSi+1=f(SNRi+1). In this case, resources allocated to the $i^{th}$ priority signal may be (a*MCSi+1/MCSi) times greater in amount than the $(i+1)^{th}$ priority signal. 'a' denotes a weight arbitrarily configured to be greater than 0.

Thereafter, the node A and the node B perform beamforming on signals having a plurality of priorities according to a pre-set frame structure for resource allocation (S1320, S1321).

The resource allocation frame structure includes information regarding a priority of a first beam to be formed in the node A and a priority of a second beam to be formed in the node B. Each base station does not allocate signals having the same priority to the same resource. Accordingly, resources can be allocated such that interference cancellation is easy.

Since the resource allocation frame structure has been described above with reference to FIG. 3a to FIG. 12, the same description will be omitted.

If the terminal A receives a signal having a second priority, i.e., a second beam, transmitted from the node B while receiving a signal having a first priority, i.e., a first beam, transmitted from the node A, the terminal A may cancel interference for the second beam by using reference information for the second beam (S1330). Since the second beam is formed in a sharp shape due to a low priority, a magnitude of interference is great. In this case, a signal for the second beam can be easily restored by using the reference information.

The terminal A may transmit feedback information regarding signals having a plurality of priorities to the node A (S1340).

Although beamforming having a plurality of priorities is performed by the node A, since beams to be directed by signals have the same direction, the terminal A may transmit only single codebook feedback information without having to distinguish codebook feedback information for each priority. Since only single codebook feedback information is transmitted, an amount of information to be fed back may be decreased.

Upon receiving single codebook feedback information from the terminal A, the node A determines different codebooks according to a priority on the basis of the received single codebook feedback information, and performs beamforming by using the different codebooks (S1350). That is, the node A may apply a different codebook for each priority on the basis of the received codebook information, and thus may generate signals having different beam widths.

For example, if codebook information received from the terminal A is a=[a1, a2, a3, a4, a5, a6, a7, a8], the node A may apply a different codebook to a resource according to a priority. If Ci denotes a codebook for beamforming of a signal having an $i^{th}$ priority and fi(a) denotes a weight vector of each antenna, a codebook may be expressed by Equation 2.

$$C_1=f_1(a),\ C_2=f_2(a),\ C_3=f_3(a) \quad \text{[Equation 2]}$$

According to another embodiment, if the node A performs beamforming on signals having priorities 1 to N, the terminal A may transmit codebook feedback information corresponding to each priority to the node A.

When performing beamforming by using the received plurality of pieces of codebook feedback information, the node A may determine a primary directivity of a low-priority beam by using high-priority feedback information. The node A may determine a codebook to be applied to a signal having an $n^{th}$ priority on the basis of codebook feedback information corresponding to priorities 1 to n ($1 =< n =< N$).

That is, beamforming of a signal having an $i^{th}$ priority is determined by using feedback information of a $1^{st}$ priority to the $i^{th}$ priority. For example, under the assumption that feedback information of a first-priority signal is $a=[a_{1,1}, a_{1,2}]$, feedback information of a second-priority signal is $a=[a_{2,1}, a_{2,2}]$, and feedback information of a third-priority signal is $a=[a_{3,1}, a_{3,2}]$, if the number of antennas of a base station is 8, a codebook may be determined by Equation 3.

$$C_1=[f(a_{1,1},0,0),f(a_{1,1},0,0),f(a_{1,1},0,0),f(a_{1,1},0,0),f(a_{1,2},0,0),f(a_{1,2},0,0),f(a_{1,2},0,0),f(a_{1,2},0,0)]^T$$

$$C_2=[f(a_{1,1},a_{2,1},0),f(a_{1,1},a_{2,1},0),f(a_{1,1},a_{2,2},0),f(a_{1,1},a_{2,2},0),f(a_{1,2},a_{2,1},0),f(a_{1,2},a_{2,1},0),f(a_{1,2},a_{2,2},0),f(a_{1,2},a_{2,2},0)]^T$$

$$C_3=[f(a_{1,1},a_{2,1},a_{3,1}),f(a_{1,1},a_{2,1},a_{1,2}),f(a_{1,1},a_{2,2},a_{3,3}),f(a_{1,1},a_{2,2},a_{3,2}),f(a_{1,2},a_{2,1},a_{3,1}),f(a_{1,2},a_{2,1},a_{1,2}),f(a_{1,2},a_{2,1},a_{3,1}),f(a_{1,2},a_{2,2},a_{3,2})]^T \quad \text{[Equation 3])}$$

In Equation 3, Ci is a codebook for beamforming of an $i^{th}$-priority signal, and f(x, y, z) denotes a weight of each antenna.

To determine the beamforming, all pieces of feedback information (e.g., i pieces of feedback information) for a $1^{st}$ priority to an $i^{th}$ priority may be used, and the number of pieces of feedback information in use may be less than i.

Although FIG. 13 is described from a perspective of the terminal A for convenience of explanation, it is also equally applied to the terminal B and the node B.

As described above, the present invention proposes a resource allocation method capable of receiving a signal reliably even if a mobile terminal is in a cell edge, that is, an adjacent region between cells, in a dense small cell structure. For this, beamforming having a plurality of beam widths may be performed, and the beam width may be determined according to an importance of a signal. Neighboring base stations may allocate orthogonal resources according to a pre-set resource frame structure, and may adjust a modulation scheme or power amount or resource allocation amount of a signal according to a priority.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed is:

1. A signal transmitting method comprising:
   transmitting a signal having a first beam width through a resource according to a predetermined frame structure for beamforming by a first base station for managing a first cell; and
   transmitting a signal having a second beam width different from the first beam width through the resource by a second base station for managing a second cell adjacent to the first cell,
   wherein the signal having the first beam width is a signal having a first priority, and the signal having the second beam width is a signal having a second priority different from the first priority, and
   wherein when the first priority is higher than the second priority, the signal having the first priority is modulated with a modulation scheme lower than a modulation scheme of the signal having the second priority.

2. The signal transmitting method of claim 1, wherein when the first priority is higher than the second priority, a beam width of the signal having the first priority is greater than a beam width of the signal having the second priority.

3. The signal transmitting method of claim 2, wherein when the first priority is higher than the second priority, determining that a transmit power of the signal having the first priority is higher than a transmit power of the signal having the second priority.

4. The signal transmitting method of claim 1, wherein the signal having the first priority is allocated to an outer resource of the first cell, and the signal having the second priority is allocated to an outer resource of the second cell.

5. The signal transmitting method of claim 1, wherein when each of the first base station and the second base station allocates signals having priorities 1 to N, the first base station and the second base station allocate more resources to a high-priority signal.

6. The signal transmitting method of claim 1,
   wherein when the first base station allocates N signals having priorities 1 to N according to a pre-set first resource frame structure, in the pre-set first resource frame structure, a signal having an $n^{th}$ priority as any one of the priorities 1 to N is allocated to be cyclically shifted on a time axis and a frequency axis according to a pattern,
   wherein when the second base station allocates the N signals having the priorities 1 to N according to a pre-set second resource frame structure, in the pre-set second resource frame structure, the signal having the nth priority as any one of the priorities 1 to N is allocated to be cyclically shifted on the time axis and the frequency axis according to the pattern, and
   wherein a priority of a signal allocated by the first base station to a resource of the pre-set first resource frame structure and the pre-set second resource frame structure is not the same as a priority of a signal allocated by the second base station.

7. The signal transmitting method of claim 1,
   wherein when the first base station allocates N signals having priorities 1 to N according to a pre-set first resource frame structure, in the pre-set first resource frame structure, a signal having an $n^{th}$ priority as any one of the priorities 1 to N is allocated to be cyclically shifted on a frequency axis, wherein when the second base station allocates the N signals having the priorities 1 to N according to a pre-set second resource frame structure, in the pre-set second resource frame structure, the signal having the nth priority as any one of the priorities 1 to N is allocated to be cyclically shifted on the frequency axis according to the pattern, and wherein a priority of a signal allocated by the first base station to a resource of the pre-set first resource frame structure and the pre-set second resource frame structure is not the same as a priority of a signal allocated by the second base station.

8. The signal transmitting method of claim 1, further comprising:
when the first base station allocates signals having priorities 1 to N, receiving single codebook feedback information from a terminal;
determining different codebooks according to the priorities on the basis of the codebook feedback information; and
generating signals having different beam widths by applying the different codebooks.

9. The signal transmitting method of claim 1, further comprising:
when the first base station allocates signals having priorities 1 to N, receiving codebook feedback information corresponding each priority from a terminal;
determining a codebook to be applied to a signal having an nth priority on the basis of codebook feedback information corresponding to the priorities 1 to n ($1 =< n =< N$); and
generating signals having the priorities 1 to N by applying the determined codebook.

10. The signal transmitting method of claim 1, wherein the first base station allocates signals having a first priority and a second priority.

11. The signal transmitting method of claim 10, wherein the first base station allocates more resources to the signal having the first priority than the signal having the second priority.

12. A signal processing method of a terminal, comprising:
receiving a signal having a beam width of a first beam formed in a first base station and a signal having a beam width of a second beam formed in a second base station adjacent to the first base station through a resource according to a predetermined frame structure for beam-forming; and
when the beam width of the first beam is greater than the beam width of the second beam, cancelling interference for the second beam by using reference information for the second beam,
wherein the predetermined frame structure contains information on a first priority of the first beam and a second priority of the second beam, and wherein when the first priority is higher than the second priority, the signal having the beam width of the first beam is modulated with a modulation scheme lower than a modulation scheme of the signal having the beam width of the second beam.

13. The signal processing method of the terminal of claim 12,
wherein N signals having priorities 1 to N are received from the first base station according to a pre-set first resource frame structure,
wherein N signals having priorities 1 to N are received from the second base station according to a pre-set second resource frame structure,
wherein in the pre-set first resource frame structure, a signal having an nth priority as any one of the priorities 1 to N is allocated to be cyclically shifted on a time axis and a frequency axis according to a pattern,
wherein in the second resource frame structure, the signal having the nth priority as any one of the priorities 1 to N is allocated to be cyclically shifted on the time axis and the frequency axis according to the pattern, and
wherein a priority of a signal allocated by the first base station to a resource of the pre-set first resource frame structure and the pre-set second resource frame structure is not the same as a priority of a signal allocated by the second base station.

14. The signal processing method of the terminal of claim 12,
wherein N signals having priorities 1 to N are received from the first base station according to a pre-set first resource frame structure,
wherein N signals having priorities 1 to N are received from the second base station according to a pre-set second resource frame structure,
wherein in the first resource frame structure, a signal having an nth priority as any one of the priorities 1 to N is allocated to be cyclically shifted on a frequency axis,
wherein in the second resource frame structure, the signal having the $n^{th}$ priority as any one of the priorities 1 to N is allocated to be cyclically shifted on the frequency axis, and
wherein a priority of a signal allocated by the first base station to a specific resource of the pre-set first resource frame structure and the pre-set second resource frame structure is not the same as a priority of a signal allocated by the second base station.

15. The signal processing method of the terminal of claim 12, further comprising:
receiving a plurality of beams having priorities 1 to N from the first base station; and
transmitting single codebook feedback information for the plurality of beams.

* * * * *